United States Patent [19]

Wächtler et al.

[11] Patent Number: 5,068,389
[45] Date of Patent: Nov. 26, 1991

[54] TERTIARY ALCOHOLS

[75] Inventors: Andreas Wächtler, Griesheim; Rudolf Eidenschink, Mühltal; Joachim Krause, Dieburg; Hans-Adolf Kurmeier, Seeheim-Jugenheim, all of Fed. Rep. of Germany

[73] Assignee: Merck Patent Gesellschaft Mit Beschrankter Haftung, Darmstadt, Fed. Rep. of Germany

[21] Appl. No.: 518,254

Related U.S. Application Data

[63] Continuation of Ser. No. 133,109, filed as PCT/EP87/00132 on Mar. 7, 1987, published as WO87/05599 Sep. 24, 1987, abandoned.

[30] Foreign Application Priority Data

Mar. 14, 1986 [DE] Fed. Rep. of Germany ....... 3608502
Feb. 3, 1987 [DE] Fed. Rep. of Germany ....... 3703145

[51] Int. Cl.$^5$ .................... C07C 255/00; C09K 19/52
[52] U.S. Cl. .............................. 558/411; 252/299.01;
252/299.6; 252/299.63; 252/299.64;
252/299.65; 252/299.66; 252/299.67; 558/423;
558/414; 558/415; 558/416; 558/425; 558/428;
558/431; 560/59; 560/102
[58] Field of Search .......... 252/299.01, 299.6, 299.63,
252/299.64, 299.65, 299.66, 299.67; 558/423,
414, 415, 416, 425, 411, 428, 431; 560/59, 102

[56] References Cited

U.S. PATENT DOCUMENTS

| | | | |
|---|---|---|---|
| 4,130,502 | 12/1978 | Eidenschink et al. | 252/299.63 |
| 4,154,697 | 5/1979 | Eidenschink et al. | 252/299.63 |
| 4,211,666 | 7/1980 | Inukai et al. | 252/299.66 |
| 4,228,029 | 10/1980 | Osman | 252/299.5 |
| 4,330,426 | 5/1982 | Eidenschink et al. | 252/299.63 |
| 4,331,552 | 5/1982 | Eidenschink et al. | 252/299.63 |
| 4,405,488 | 9/1983 | Sugimori et al. | 252/299.63 |
| 4,406,814 | 9/1983 | Ferrato | 252/299.63 |
| 4,419,263 | 12/1983 | Praefcke et al. | 252/299.63 |
| 4,439,340 | 3/1984 | Kojima et al. | 252/299.63 |
| 4,502,974 | 3/1985 | Sugimori et al. | 252/299.63 |
| 4,505,837 | 3/1985 | Romer et al. | 252/299.6 |
| 4,510,069 | 4/1985 | Eidensemime et al. | 525/299.63 |
| 4,620,938 | 11/1986 | Romer et al. | 252/299.63 |
| 4,696,549 | 9/1987 | Chan et al. | 252/299.66 |
| 4,910,350 | 3/1990 | Tanaka et al. | 570/129 |
| 4,946,986 | 8/1990 | Tanaka et al. | 558/411 |

FOREIGN PATENT DOCUMENTS

| | | | |
|---|---|---|---|
| 2636684 | 2/1978 | Fed. Rep. of Germany | 252/299.63 |
| 87/05015 | 8/1987 | Fed. Rep. of Germany | 252/299.63 |
| 57-4927 | 1/1982 | Japan | 252/299.6 |
| 57-11935 | 1/1982 | Japan | 252/299.6 |
| 57-158729 | 9/1982 | Japan | 252/299.6 |
| 61-268646 | 11/1986 | Japan | 252/299.63 |
| 2078727 | 1/1982 | United Kingdom | 252/299.6 |
| 86/05484 | 9/1986 | World Int. Prop. O. | 252/299.63 |
| 86/05486 | 9/1986 | World Int. Prop. O. | 252/299.63 |

OTHER PUBLICATIONS

Ghatak, U. R. et al., J. Chem. Soc. Perkin I, pp. 1669–1673 (1976).
Reisner, G. M. et al., Can. J. Chem., vol. 61, pp. 1422–1427 (1983).
C.A., vol. 54, 1410e (1960).
C.A., vol. 51, 8663h (1957).
Hall, H. K. et al., J. Am. Chem. Soc., vol. 93, No. 1, pp. 110–120 (Jan. 1971).

*Primary Examiner*—John S. Maples
*Assistant Examiner*—Richard Treanor
*Attorney, Agent, or Firm*—Millen, White & Zelano

[57] ABSTRACT

The invention relates to tertiary alcohols of the formula I

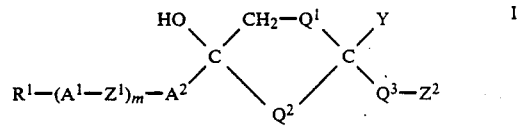

wherein $R^1$, $A^1$, $Z^1$, m, $A^2$, Y, $Q^1$, $Q^2$, $Q^3$ and $Z^2$ have the meanings indicated in claim 1, and also to a process for the preparation of these compounds.

9 Claims, No Drawings

TERTIARY ALCOHOLS

This application is a continuation, of application Ser. No 07/133,109, filed as PCT/EP87/00132 on Mar. 7, 1987, published as WO87/05599 Sep. 24, 1987, now abandoned.

The invention relates to tertiary alcohols of the formula I

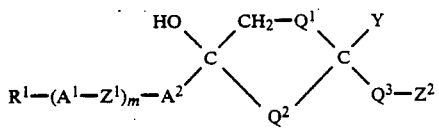

wherein $R^1$ is halogen or alkyl which has 1-15 C atoms and in which one or two non-adjacent $CH_2$ groups can be replaced by O atoms and/or —CO— groups and/or —CO—O— groups and/or —CH=CH— groups, or, in the event that Y is H or CN, $R^1$ is also H, $A^1$ is 1,4-phenylene or 1,4-cyclohexylene which is unsubstituted or monosubstituted or polysubstituted by halogen and/or $CH_3$ groups, $Z^1$ is —$CH_2CH_2$—, —$CH_2O$—, —$OCH_2$— or a single bond, m is 0, 1 or 2, $A^2$ is 1,4-phenylene which is unsubstituted or monosubstituted or polysubstituted by halogen and/or $CH_3$ groups,

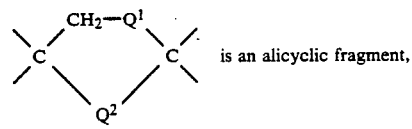 is an alicyclic fragment, $Z^2$ is —COOR or —CN, $Q^3$ is alkylene having 1-15 C atoms, alkylidene having 2-15 C atoms, an aromatic system or a single bond, Y is H, CN or R and R is alkyl having 1-15 C atoms, and $Q^2$ and $Q^3$ are not both simultaneously a single bond and to metal alcoholates thereof and to a process for the preparation of these compounds.

Tertiary alcohols of the formula I are of great interest as intermediate products for the preparation of liquid-crystal compounds.

Readily accessible intermediate products from which the corresponding substances having liquid-crystal properties can be obtained in as few stages of synthesis as possible are required for the preparation of liquid-crystal substances.

It was the object of the present invention to find appropriately readily synthesizable intermediate products for the preparation of liquid crystals and also a process for their preparation.

This object has been achieved by providing the tertiary alcohols of the formula I and a process for their preparation.

All the processes hitherto known for the preparation of similar compounds of the formula I lead to unsatisfactory results. The factors responsible for this are, above all, poor yields and in some cases starting compounds which are difficult of access.

Para-substituted phenylcyclohexanecarboxylic acids and their esters are prepared, for example, by reacting cyclohexene with acetyl chloride/$AlCl_3$ and with benzene, followed by haloform degradation of the ketone to the carboxylic acid (described in J. Amer. Chem. Soc. 67, 1045 (1945), W.S. Johnson et al. and by Nenitzescu et al., Ann. 519 (260) 1935). The substituent in the p-position, for example $OCH_3$, must then be introduced by electrophilic aromatic substitution (for example nitration, reduction, diazotization, introduction of the OH group and methylation), which is a very involved route.

A further example describes the process for the preparation of 4-[4-(trans-4-alkylcyclohexyl)-phenyl]-cyclohexanecarboxylic acids (according to EP 90,671) by reducing 4-[trans-4-alkylcyclohexyl]biphenyl-4-carboxylic acid with metallic sodium in isoamyl alcohol. The disadvantages of this process are a very high consumption of reducing agent and relatively low yields. A process is also known for the preparation of compounds of the formula I, described in J. Org. Chem. 39, 2787, in which corresponding Grignard compounds are reacted with cyclohexanones. Undesirable side reactions (such as, for example, aldol reactions between the carbonyl compounds) often take place in this process, however.

Products similar to the compounds of the formula I are also described, for example, in German Patent Specification 2,701,591. In this patent 4-alkylcyclohexanones are reacted with aromatic Grignard compounds.

However, this process is not possible for the preparation of the tertiary alcohols of the formula I, since Grignard compounds would attack both the keto group on the cyclohexanone and also the CN or ester group present in the p-position. In the case of reaction with Grignard compounds, it would be necessary to reintroduce a substituent of this type subsequently.

It was therefore the object of the present invention also to find a process for the preparation of the compounds of the formula I which does not have the disadvantages described in the present processes or has these disadvantages only to a slight extent.

It has been found, surprisingly, that organozirconium or organotitanium compounds are excellently suitable for the preparation of compounds of the formula I.

The invention therefore relates to the compounds of the formula I',

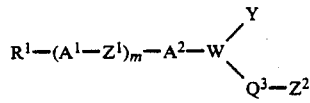

wherein $R^1$, $A^1$, $Z^1$, m, $A^2$, Y, $Q^3$ and $Z^2$ have the meanings indicated and W is

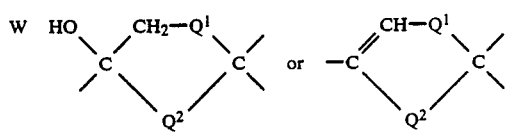

in which $Q^1$ and $Q^2$ have the meanings indicated, in particular to the tertiary alcohols of the formula I and metal alcoholates thereof and to a process for the preparation of compounds of the formula I, characterized in that a keto compound of the formula II

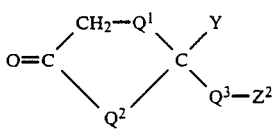  II wherein $Q^1$, $Q^2$, $Q^3$, Y, $Z^2$ and R have the meanings indicated above, is reacted with an appropriate aryltitanium trialkoxide or arylzirconium trialkoxide.

The invention also relates to the use of the compounds of the formula I as intermediate products for the preparation of liquid crystals.

For the sake of simplicity, in what follows, Phe is a 1,4-phenylene group which is unsubstituted or monosubstituted or polysubstituted by halogen and/or $CH_3$ groups, Cy is a 1,4-cyclohexylene group which is unsubstituted or monosubstituted or polysubstituted by halogen and/or $CH_3$ groups, and X is the group

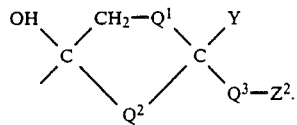

The compounds of the formula I accordingly embrace the compounds of the partial formula Ia (in the case where m=0), Ib to Ic (where m=1) and Id to Ig (where m=2):

| | |
|---|---|
| $R^1$—Phe—X | Ia |
| $R^1$—$A^1$—$A^2$—X | Ib |
| $R^1$—$A^1$—$Z^1$—$A^2$—X | Ic |
| $R^1$—$A^1$—$A^1$—$A^2$—X | Id |
| $R^1$—$A^1$—$Z^1$—$A^1$—$A^2$—X | Ie |
| $R^1$—$A^1$—$A^1$—$Z^1$—$A^2$—X | If |
| $R^1$—$A^1$—$Z^1$—$A^1$—$Z^1$—$A^2$—X | Ig |

The compounds of the partial formula Ib preferably embrace those of the partial formulae Iba and Ibb:

| | |
|---|---|
| $R^1$—Phe—Phe—X | Iba |
| $R^1$—Cy—Phe—X | Ibb |

The compounds of the partial formula Ic preferably embrace those of the partial formulae Ica to Icf:

| | |
|---|---|
| $R^1$—Phe—$CH_2CH_2$—Phe—X | Ica |
| $R^1$—Cy—$CH_2CH_2$—Phe—X | Icb |
| $R^1$—Phe—$CH_2O$—Phe—X | Icc |
| $R^1$—Cy—$CH_2O$—Phe—X | Icd |
| $R^1$—Phe—$OCH_2$—Phe—X | Ice |
| $R^1$—Cy—$OCH_2$—Phe—X | Icf |

The compounds of the partial formula Id preferably embrace those of the partial formulae Ida to Idd:

| | |
|---|---|
| $R^1$—Phe—Phe—Phe—X | Ida |
| $R^1$—Cy—Phe—Phe—X | Idb |
| $R^1$—Phe—Cy—Phe—X | Idc |
| $R^1$—Cy—Cy—Phe—X | Idd |

The compounds of the partial formula Ie preferably embrace those of the partial formulae Iea to Ied:

| | |
|---|---|
| $R^1$—Phe—$Z^1$—Phe—Phe—X | Iea |
| $R^1$—Cy—$Z^1$—Phe—Phe—X | Ieb |
| $R^1$—Phe—$Z^1$—Cy—Phe—X | Iec |
| $R^1$—Cy—$Z^1$—Cy—Phe—X | Ied |

The compounds of the partial formula If preferably embrace those of the partial formulae Ifa to Ifd:

| | |
|---|---|
| $R^1$—Phe—Phe—$Z^1$—Phe—X | Ifa |
| $R^1$—Cy—Phe—$Z^1$—Phe—X | Ifb |
| $R^1$—Phe—Cy—$Z^1$—Phe—X | Ifc |
| $R^1$—Cy—Cy—$Z^1$—Phe—X | Ifd |

The compounds of the partial formula Ig preferably embrace those of the partial formulae Iga to Igd:

| | |
|---|---|
| $R^1$—Phe—$Z^1$—Phe—$Z^1$—Phe—X | Iga |
| $R^1$—Cy—$Z^1$—Phe—$Z^1$—Phe—X | Igb |
| $R^1$—Phe—$Z^1$—Cy—$Z^1$—Phe—X | Igc |
| $R^1$—Cy—$Z^1$—Cy—$Z^1$—Phe—X | Igd |

In the preceding and following formulae partial formulae $R^1$ is preferably an alkyl group which has 1-15 C atoms and in which one or two non-adjacent $CH_2$ groups can also be replaced by O atoms and/or —CO— groups and/or —CO—O— groups and/or —CH=CH— groups. If Y is H or CN, $R^1$ can also be H.

$A^2$ is preferably unsubstituted 1,4-phenylene and also 1,4-phenylene which is monosubstituted by halogen. A suitable halogen is preferably F, Cl or Br, especially F.

M is preferably 1 or 2, especially 1.

Z has primarily the meaning of a single bond, secondarily $Z^1$ is —$CH_2CH_2$— and also —$OCH_2$— or —$CH_2O$—.

$A^1$ is preferably unsubstituted 1,4-phenylene or 1,4-cyclohexylene. If these groups are present in a substituted form, monosubstitution by F, Cl or Br, preferably monosubstitution by fluorine, is preferred.

The alicyclic fragment

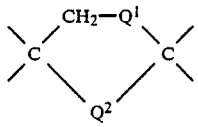

can consist of monocyclic, dicyclic or bicyclic (sic) rings or of several rings, including fused rings, of any desirable size. Amongst these, the following alicyclic fragments are very particularly preferred:

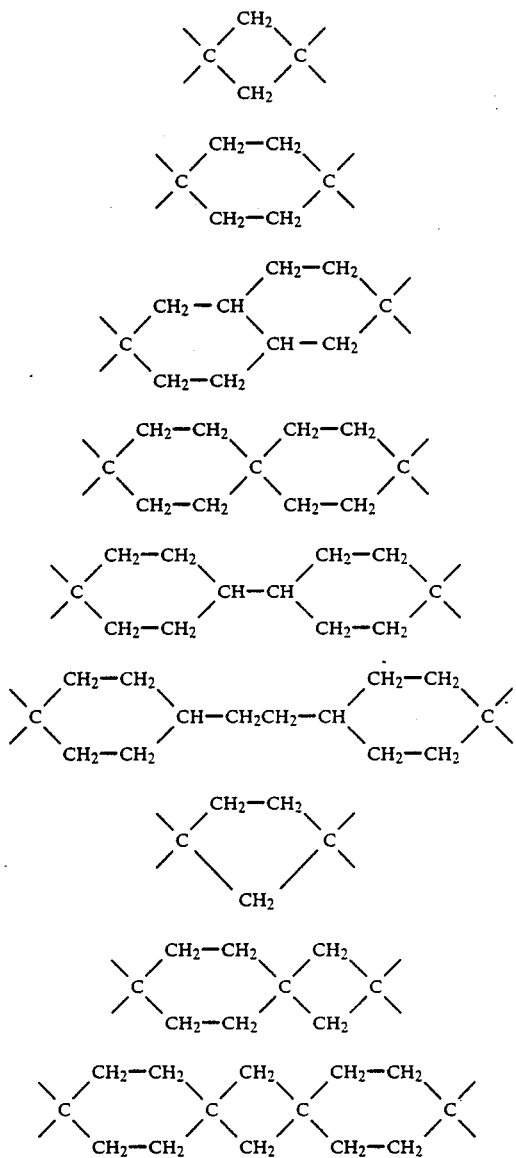

In the preceding and following formulae $Q^3$ is alkylene having 1 to 15 C atoms, preferably 1-10 C atoms and particularly 1-5 C atoms, and accordingly is preferably methylene, ethylene, propylene, butylene, pentylene, hexylene, heptylene, octylene, nonylene or decylene, or is also alkylidene having 2-15 C atoms, preferably 2-7 C atoms, and accordingly is preferably ethylidene, propylidene, butylidene, pentylidene, hexylidene or heptylidene and also octylidene, nonylidene or decylidene.

$Q^3$ is also an aromatic system or a single bond, which is particularly preferred. However, $Q^2$ and $Q^3$ are not simultaneously a single bond.

$Z^2$ is —COOR or —CN, preferably an ester group.

R is alkyl having 1-15 C atoms, preferably having 3-15 C atoms and particularly preferably having 5-15 C atoms.

Y is H, CN or R, preferably H. R has the meaning given above.

In the preceding and following formulae R or $R^1$ is preferably linear or branched alkyl having 1-15 C atoms, preferably 2-10 C atoms, and accordingly is preferably ethyl, propyl, butyl, pentyl, hexyl, heptyl, octyl, nonyl or decyl, and also methyl, undecyl, dodecyl, tridecyl, tetradecyl or pentadecyl. Branched radicals such as isopropyl, 2-butyl, isopentyl, 1-methylpentyl, 2-methylpentyl, 1-methylhexyl or 1-methylheptyl are also preferred. $R^1$ is preferably also ethoxy, propoxy, butoxy, pentyloxy, hexyloxy, heptyloxy, octyloxy, nonyloxy or decyloxy, and also methoxy, undecyloxy, dodecyloxy, tridecyloxy, tetradecyloxy or pentadecyloxy or isopropoxy, isopentyloxy, 2-butoxy or 1-methylpentyloxy. The Rs in Y and COOR can be identical or different.

The process according to the invention starts from the readily accessible aryl halides. These are converted by known methods into Grignard reagents or lithiated, and the reaction with a chlorotrialkyl orthotitanate or orthozirconate to give the corresponding aryltitanium trialkoxide or arylzirconium trialkoxide is then carried out.

This reaction is preferably carried out in an inert solvent, such as, for example, tetrahydrofuran, diethyl ether, benzene, toluene, hexane and others, or in suitable mixtures of these solvents and at temperatures from $-78°$ C. to 100° C., preferably at $-15°$ C. to 50° C.

The corresponding keto compound is then added, also in one of the inert solvents mentioned above and at the temperatures indicated. The organometallic compound then adds on selectively to the keto group (cf. Angew. Chem. 95, 12 (1983)) to give the corresponding metal alcoholate, in which the metal present is, for example, magnesium, lithium, titanium or zirconium. This alcoholate is then converted in a customary manner into the corresponding tertiary alcohol, which can be dehydrated readily. The compounds of the formula I obtained in this way can be used for the synthesis of liquid-crystal compounds and can readily be processed further to give a very wide variety of end products, e.g., by hydrogenation to give the correspondingly saturated rings, by dehydrogenation to give aromatic compounds, by elimination of water to give compounds of the formula IV

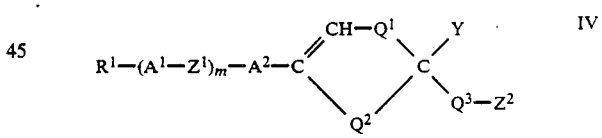

and, if appropriate, by subsequent hydrogenation to give compounds of the formula V.

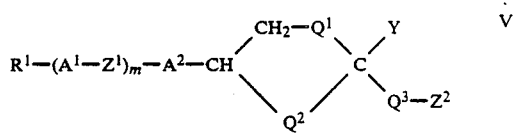

It is also possible to saponify corresponding esters ($Z^2$=COOR) or nitriles to give the corresponding acids and, if appropriate, to attach the latter to further rings.

It is also possible to introduce further substituents into the compounds of the formulae I, IV or V.

There are thus many possibilities available for preparing further liquid-crystal products in a simple manner from the tertiary alcohols of the formula I.

The compounds of the formula IV are also novel and are therefore also a subject of the invention.

The starting compounds employed are keto compounds of the formula II and aryl halides of formula VI $$R^1-(A^1-Z^1)_m-A^2\text{-Halogen} \qquad VI$$

wherein $R^1$, $A^1$, $Z^1$, m and $A^2$ have the meaning indicated in formula I and halogen is fluorine, chlorine, iodine or bromine. It is preferable t employ the corresponding bromides, and also the chlorides or iodides.

The formulae VIa to VIt constitute a group of very particularly preferred starting compounds:

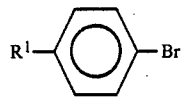
VIa

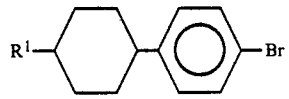
VIb

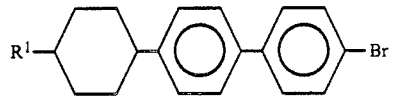
VIc

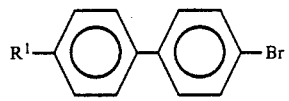
VId

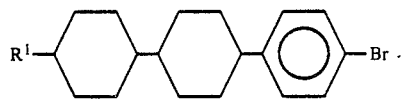
VIe

VIf

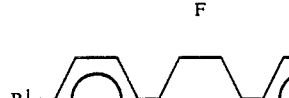
VIg

VIh

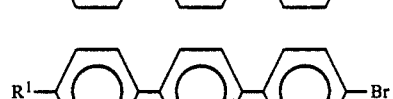
VIi

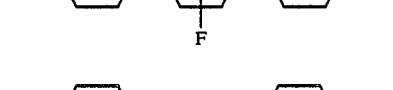
VIj

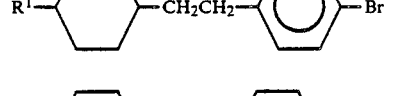
VIk

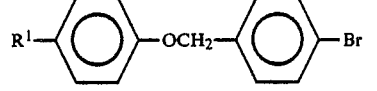
VIl

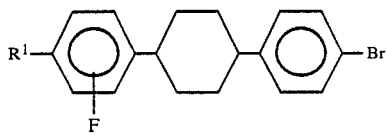
VIm

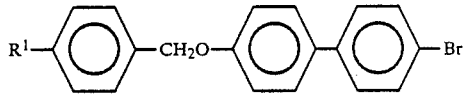
VIn

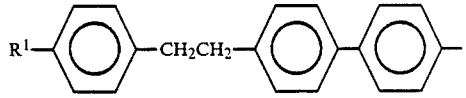
VIo

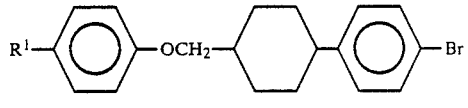
VIp

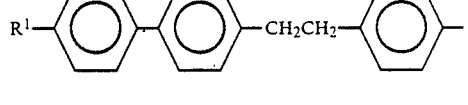
VIq

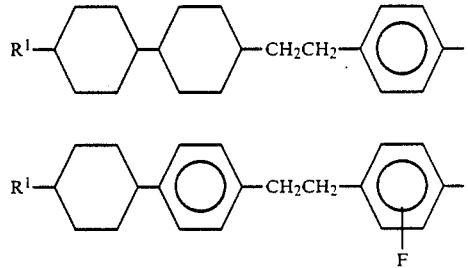
VIr

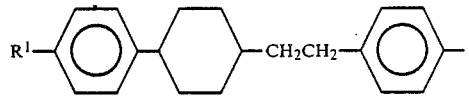
VIs

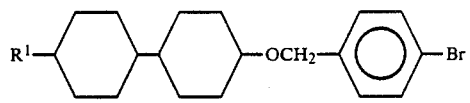
VIt

Suitable keto compounds which can be employed are any desired cyclic keto esters or keto nitriles of the formula II

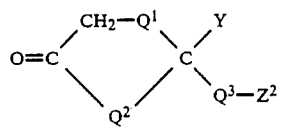
II

In this formula Y, $Q^3$ and $Z^2$ have the preferred meanings indicated.

All the structures described, especially the preferred structures of the formulae IIIa to IIIi are suitable for the alicyclic fragment

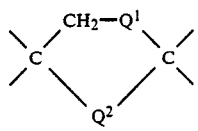

The trialkoxychloro compounds, in particular chlorotitanium or chlorozirconium triisopropoxide are preferably employed as the organozirconium or organotitanium reagent. In this regard, the organotitanium compounds are preferred.

The process according to the invention can therefore be applied to any desired cyclic keto esters, with the exception of β-keto esters, keto nitriles and the corresponding arylhalides which can be converted into an organometallic compound.

Hence intermediate products and a process for their preparation, which starts from readily accessible starting materials and affords, in good yields, a large number of structures, have been found.

The compounds of the formula I are of great interest as intermediate products for the preparation of liquid-crystal compounds.

The keto compounds of the formula II employed as starting compounds are in part known, for example the compounds VIIa or VIIb, which are described in German Offenlegungsschrift 3,407,113:

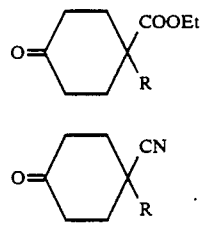

However, formula II also embraces new compounds of the formula II'

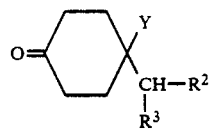

wherein $R^2$ is alkyl having 2-15 C atoms, Y has the meaning indicated above and $R^3$ is CN or $COOR^4$, which are also a subject of the invention. In these compounds $R^4$ is alkyl having 3-15 C, preferably 5-15,C atoms.

The compounds of the formula II' can be prepared by generally known methods of organic chemistry.

The following examples are intended to illustrate the invention in greater detail, without limiting it. m.p.=melting point. In the preceding and following text percentages are percent by weight; the temperatures are quoted in degrees Centigrade.

EXAMPLE 1

A solution of 0.1 M TiCl[OCH(CH$_3$)$_2$]$_3$ in 50 ml of THF is added at 40° to a Grignard reagent prepared from 0.1 M 4-bromoanisole in 100 ml of THF and 0.11 M magnesium turnings in 20 ml of THF, and the mixture is stirred for 30 minutes. 0.1 M ethyl cyclohexanone-4-carboxylate in 50 ml of THF is then added at 30-40°, and the reaction mixture is stirred for several hours The tertiary alcohol formed can either be isolated in a customary manner or can be dehydrated immediately afterwards without isolation.

500 ml of H$_2$O and 50 ml of hydrochloric acid are added, the mixture is extracted with 250 ml of TBM, the extract is washed and evaporated and the substance is purified by means of chromatography over silica gel (in toluene, eluted with acetone), and is then heated with ethanol/hydrochloric acid, the mixture is evaporated and the product is washed and filtered off to give, after recrystallization, ethyl 4-(4-methoxyphenyl)-cyclohexenecarboxylate.

The following dehydrated products are prepared analogously via the corresponding tertiary alcohols
methyl 4-(4-methoxyphenyl)-cyclohexenecarboxylate
propyl 4-(4-methoxyphenyl)-cyclohexenecarboxylate
butyl 4-(4-methoxyphenyl)-cyclohexenecarboxylate
pentyl 4-(4-methoxyphenyl)-cyclohexenecarboxylate
hexyl 4-(4-methoxyphenyl)-cyclohexenecarboxylate
isopropyl 4-(4-methoxyphenyl)-cyclohexenecarboxylate
2-methylpentyl 4-(4-methoxyphenyl)-cyclohexenecarboxylate
1-methylheptyl 4-(4-methoxyphenyl)-cyclohexenecarboxyoxylate
octyl 4-(4-methoxyphenyl)-cyclohexenecarboxylate
methyl 4-(4-chlorophenyl)-cyclohexenecarboxylate
ethyl 4-(4-chlorophenyl)-cyclohexenecarboxylate
propyl 4-(4-chlorophenyl)-cyclohexenecarboxylate
butyl 4-(4-chlorophenyl)-cyclohexenecarboxylate
pentyl 4-(4-chlorophenyl)-cyclohexenecarboxylate
hexyl 4-(4-chlorophenyl)-cyclohexenecarboxylate
isopropyl 4-(4-chlorophenyl)-cyclohexenecarboxylate
2-methylpentyl 4-(4-chlorophenyl)-cyclohexenecarboxylate
1-methylheptyl 4-(4-chlorophenyl)-cyclohexenecarboxylate
octyl 4-(4-chlorophenyl)-cyclohexenecarboxylate
methyl 4-(4-pentylphenyl)-cyclohexenecarboxylate
ethyl 4-(4-pentylphenyl)-cyclohexenecarboxylate
propyl 4-(4-pentylphenyl)-cyclohexenecarboxylate
butyl 4-(4-pentylphenyl)-cyclohexenecarboxylate
pentyl 4-(4-pentylphenyl)-cyclohexenecarboxylate
hexyl 4-(4-pentylphenyl)-cyclohexenecarboxylate
isopropyl 4-(4-pentylphenyl)-cyclohexenecarboxylate
2-methylpentyl 4-(4-pentylphenyl)-cyclohexenecarboxylate
1-methylheptyl 4-(4-pentylphenyl)-cyclohexenecarboxylate
octyl 4-(4-pentylphenyl)-cyclohexenecarboxylate
methyl 4-[4-(trans-4-propylcyclohexyl)-phenyl]-cyclohexenecarboxylate
ethyl 4-[4-(trans-4-propylcyclohexyl)-phenyl]-cyclohexenecarboxylate
propyl 4-[4-(trans-4-propylcyclohexyl)-phenyl]-cyclohexenecarboxylate
butyl 4-[4-(trans-4-propylcyclohexyl)-phenyl]-cyclohexpentyl
pentyl 4-[4-(trans-4-propylcyclohexyl)-phenyl]-cyclohexenecarboxylate
hexyl 4-[4-(trans-4-propylcyclohexyl)-phenyl]-cyclohexenecarboxylate
isopropyl 4-[4-(trans-4-propylcyclohexyl)-phenyl]-cyclohexenecarboxylate
2-methylpentyl 4-[4-(trans-4-propylcyclohexyl)-phenyl]-cyclohexenecarboxylate 1-methylheptyl 4-[4-(trans-4-propylcyclohexyl)-phenyl]-cyclohexenecarboxylate
octyl 4-[4-(trans-4-propylcyclohexyl)-phenyl]-cyclohexenecarboxylate
nethyl 4-[4'-(trans-4-pentylcyclohexyl)-biphenyl-4-yl]-cyclohexenecarboxylate
ethyl 4-[4'-(trans-4-propylcyclohexyl)-biphenyl-4-yl]-cyclohexenecarboxylate
propyl 4-[4'-(trans-4-propylcyclohexyl)-biphenyl-4-yl]-cyclohexenecarboxylate
butyl 4-[4'-(trans-4-propylcyclohexyl)-biphenyl-4-yl]-cyclohexenecarboxylate
pentyl 4-[4'-(trans-4-propylcyclohexyl)-biphenyl-4-yl]-cyclohexenecarboxylate
hexyl 4-[4'-(trans-4-propylcyclohexyl)-biphenyl-4-yl]-cyclohexenecarboxylate
isopropyl 4-[4'-(trans-4-propylcyclohexyl)-biphenyl-4-yl]-cyclohexenecarboxylate
2-methylpentyl 4-[4'-(trans-4-propylcyclohexyl)-biphenyl-4-yl]-cyclohexenecarboxylate
1-methylheptyl 4-[4'-(trans-4-propylcyclohexyl)-biphenyl-4-yl]-cyclohexenecarboxylate
octyl 4-[4'-(trans-4-propylcyclohexyl)-biphenyl-4-yl]-cyclohexenecarboxylate
methyl 4-(4'-pentoxybiphenyl-4-yl)-cyclohexenecarboxylate
ethyl 4-(4'-pentoxybiphenyl-4-yl)-cyclohexenecarboxylate
propyl 4-(4'-pentoxybiphenyl-4-yl)-cyclohexenecarboxylate
butyl 4-(4'-pentoxybiphenyl-4-yl)-cyclohexenecarboxylate
pentyl 4-(4'-pentoxybiphenyl-4-yl)-cyclohexenecarboxylate
hexyl 4-(4'-pentoxybiphenyl-4-yl)-cyclohexenecarboxylate
isopropyl 4-(4'-pentoxybiphenyl-4-yl)-cyclohexenecarboxylate
2-methylpentyl 4-(4'-pentoxybiphenyl-4-yl)-cyclohexenecarboxylate
1-methylheptyl 4-(4'-pentoxybiphenyl-4-yl)-cyclohexenecarboxylate
octyl 4-(4'-pentoxybiphenyl-4-yl)-cyclohexenecarboxylate
methyl 4-(4-methoxyphenyl)-bicyclohexene-4'-carboxylate
ethyl 4-(4-methoxyphenyl)-bicyclohexene-4'-carboxylate
propyl 4-(4-methoxyphenyl)-bicyclohexene-4'-carboxylate
butyl 4-(4-methoxyphenyl)-bicyclohexene-4'-carboxylate
pentyl 4-(4-methoxyphenyl)-bicyclohexene-4'-carboxylate
hexyl 4-(4-methoxyphenyl)-bicyclohexene-4'-carboxylate
isopropyl 4-(4-methoxyphenyl)-bicyclohexene-4'-carboxylate
2-methylpentyl 4-(4-methoxyphenyl)-bicyclohexene-4'-carboxylate
1-methylheptyl 4-(4-methoxyphenyl)-bicyclohexene-4'-carboxylate
octyl 4-(4-methoxyphenyl)-bicyclohexene-4'-carboxylate
methyl 6-(4-pentylphenyl)-1,2,3,4,5,8,9,10-octahydronaphthaline-2-carboxylate
ethyl 6-(4-pentylphenyl)-1,2,3,4,5,8,9,10-octahydronaphthaline-2-carboxylate
propyl 6-(4-pentylphenyl)-1,2,3,4,5,8,9,10-octahydronaphthaline-2-carboxylate
butyl 6-(4-pentylphenyl)-1,2,3,4,5,8,9,10-octahydronaphthaline-2-carboxylate
pentyl 6-(4-pentylphenyl)-1,2,3,4,5,8,9,10-octahydronaphthaline-2-carboxylate
hexyl 6-(4-pentylphenyl)-1,2,3,4,5,8,9,10-octahydronaphthaline-2-carboxylate
isopropyl 6-(4-pentylphenyl)-1,2,3,4,5,8,9,10-octahydronaphthaline-2-carboxylate
2-methylpentyl 6-(4-pentylphenyl)-1,2,3,4,5,8,9,10-octahydronaphthaline-2-carboxylate
1-methylheptyl 6-(4-pentylphenyl)-1,2,3,4,5,8,9,10-octahydronaphthaline-2-carboxylate
octyl 6-(4-pentylphenyl)-1,2,3,4,5,8,9,10-octahydronaphthaline-2-carboxylate

EXAMPLE 2

788 ml of a 1.6 molar solution of butyllithium in n-hexane are added at −15° C. and with the exclusion of atmospheric oxygen and moisture to 462 g of 4-bromo-4'-n-octyloxybiphenyl in 1.4 l of toluene and 150 ml of THF.

After stirring for approx. 15 minutes, 313 g of chlorotriisopropyl orthotitanate in 380 ml of toluene containing 40 ml of THF are added, also at −15° C.

After stirring for a further 15 minutes, 228 g of ethyl cyclohexanecarboxylate in 600 ml of toluene are added at −15° C., and the mixture is stirred overnight while it slowly warms up to room temperature. 2 l of 1 N HCl are then added all at once to the reaction mixture. The whole reaction mixture is then filtered through a suction filter covered with a dry layer of Celite. The organic phase of the filtrate is separated off, dried and concentrated. The residue is taken up in toluene, and the non-polar byproducts are removed over a silica gel column, using toluene. The ethyl 1-hydroxy-1-(4-octyloxybiphenyl-4'-yl)-cyclohexane-4-carboxylate is then washed off the column by means of methanol or acetone and is isolated by evaporation.

The following are prepared analogously:
methyl 1-hydroxy-1-(4-octyloxybiphenyl-4'-yl)-cyclohexane-4-carboxylate
propyl 1-hydroxy-1-(4-octyloxybiphenyl-4'-yl)-cyclohexane-4-carboxylate
butyl 1-hydroxy-1-(4-octyloxybiphenyl-4'-yl)-cyclohexane-4-carboxylate
pentyl 1-hydroxy-1-(4-octyloxybiphenyl-4'-yl)-cyclohexane-4-carboxylate
hexyl 1-hydroxy-1-(4-octyloxybiphenyl-4'-yl)-cyclohexane-4-carboxylate
heptyl 1-hydroxy-1-(4-octyloxybiphenyl-4'-yl)-cyclohexane-4-carboxylate
octyl 1-hydroxy-1-(4-octyloxybiphenyl-4'-yl)-cyclohexane-4-carboxylate
methyl 1-hydroxy-1-(4-heptyloxybiphenyl-4'-yl)-cyclohexane-4-carboxylate
ethyl 1-hydroxy-1-(4-heptyloxybiphenyl-4'-yl)-cyclohexane-4-carboxylate
propyl 1-hydroxy-1-(4-heptyloxybiphenyl-4'-yl)-cyclohexane-4-carboxylate
butyl 1-hydroxy-1-(4-heptyloxybiphenyl-4'-yl)-cyclohexane-4-carboxylate
pentyl 1-hydroxy-1-(4-heptyloxybiphenyl-4'-yl)-cyclohexane-4-carboxylate
hexyl 1-hydroxy-1-(4-heptyloxybiphenyl-4'-yl)-cyclohexane-4-carboxylate heptyl 1-hydroxy-1-(4-heptyloxybiphenyl-4'-yl)-cyclohexane-4-carboxylate
octyl 1-hydroxy-1-(4-heptyloxybiphenyl-4'-yl)-cyclohexane-4-carboxylate
methyl 1-hydroxy-1-(4-hexyloxybiphenyl-4'-yl)-cyclohexane-4-carboxylate
ethyl 1-hydroxy-1-(4-hexyloxybiphenyl-4'-yl)-cyclohexane-4-carboxylate
propyl 1-hydroxy-1-(4-hexyloxybiphenyl-4'-yl)-cyclohexane-4-carboxylate
butyl 1-hydroxy-1-(4-hexyloxybiphenyl-4'-yl)-cyclohexane-4-carboxylate
pentyl 1-hydroxy-1-(4-hexyloxybiphenyl-4'-yl)-cyclohexane-4-carboxylate
hexyl 1-hydroxy-1-(4-hexyloxybiphenyl-4'-yl)-cyclohexane-4-carboxylate
heptyl 1-hydroxy-1-(4-hexyloxybiphenyl-4'-yl)-cyclohexane-4-carboxylate
octyl 1-hydroxy-1-(4-hexyloxybiphenyl-4'-yl)-cyclohexane-4-carboxylate
methyl 1-hydroxy-1-(4-pentyloxybiphenyl-4'-yl)-cyclohexane-4-carboxylate
ethyl 1-hydroxy-1-(4-pentyloxybiphenyl-4'-yl)-cyclohexane-4-carboxylate
propyl 1-hydroxy-1-(4-pentyloxybiphenyl-4'-yl)-cyclohexane-4-carboxylate
butyl 1-hydroxy-1-(4-pentyloxybiphenyl-4'-yl)-cyclohexane-4-carboxylate
pentyl 1-hydroxy-1-(4-pentyloxybiphenyl-4'-yl)-cyclohexane-4-carboxylate
hexyl 1-hydroxy-1-(4-pentyloxybiphenyl-4'-yl)-cyclohexane-4-carboxylate
heptyl 1-hydroxy-1-(4-pentyloxybiphenyl-4'-yl)-cyclohexane-4-carboxylate
octyl 1-hydroxy-1-(4-pentyloxybiphenyl-4'-yl)-cyclohexane-4-carboxylate
methyl 1-hydroxy-1-(4-butoxybiphenyl-4'-yl)-cyclohexane-4-carboxylate
ethyl 1-hydroxy-1-(4-butoxybiphenyl-4'-yl)-cyclohexane-4-carboxylate
propyl 1-hydroxy-1-(4-butoxybiphenyl-4'-yl)-cyclohexane-4-carboxylate
butyl 1-hydroxy-1-(4-butoxybiphenyl-4'-yl)-cyclohexane-4-carboxylate
pentyl 1-hydroxy-1-(4-butoxybiphenyl-4'-yl)-cyclohexane-4-carboxylate
hexyl 1-hydroxy-1-(4-butoxybiphenyl-4'-yl)-cyclohexane-4-carboxylate
heptyl 1-hydroxy-1-(4-butoxybiphenyl-4'-yl)-cyclohexane-4-carboxylate
octyl 1-hydroxy-1-(4-butoxybiphenyl-4'-yl)-cyclohexane-4-carboxylate
methyl 1-hydroxy-1-(4-propoxybiphenyl-4'-yl)-cyclohexane-4-carboxylate
ethyl 1-hydroxy-1-(4-propoxybiphenyl-4'-yl)-cyclohexane-4-carboxylate
propyl 1-hydroxy-1-(4-propoxybiphenyl-4'-yl)-cyclohexane-4-carboxylate
butyl 1-hydroxy-1-(4-propoxybiphenyl-4'-yl)-cyclohexane-4-carboxylate
pentyl 1-hydroxy-1-(4-propoxybiphenyl-4'-yl)-cyclohexane-4-carboxylate
hexyl 1-hydroxy-1-(4-propoxybiphenyl-4'-yl)-cyclohexane-4-carboxylate
heptyl 1-hydroxy-1-(4-propoxybiphenyl-4'-yl)-cyclohexane-4-carboxylate
octyl 1-hydroxy-1-(4-propoxybiphenyl-4'-yl)-cyclohexane-4-carboxylate
methyl 1-hydroxy-1-(4-ethoxybiphenyl-4'-yl)-cyclohexane-4-carboxylate
ethyl 1-hydroxy-1-(4-ethoxybiphenyl-4'-yl)-cyclohexane-4-carboxylate
propyl 1-hydroxy-1-(4-ethoxybiphenyl-4'-yl)-cyclohexane-4-carboxylate
butyl 1-hydroxy-1-(4-ethoxybiphenyl-4'-yl)-cyclohexane-4-carboxylate
pentyl 1-hydroxy-1-(4-ethoxybiphenyl-4'-yl)-cyclohexane-4-carboxylate
hexyl 1-hydroxy-1-(4-ethoxybiphenyl-4'-yl)-cyclohexane-4-carboxylate
heptyl 1-hydroxy-1-(4-ethoxybiphenyl-4'-yl)-cyclohexane-4-carboxylate
octyl 1-hydroxy-1-(4-ethoxybiphenyl-4'-yl)-cyclohexane-4-carboxylate
methyl 1-hydroxy-1-(4-methoxybiphenyl-4'-yl)-cyclohexane-4-carboxylate
ethyl 1-hydroxy-1-(4-methoxybiphenyl-4'-yl)-cyclohexane-4-carboxylate
propyl 1-hydroxy-1-(4-methoxybiphenyl-4'-yl)-cyclohexane-4-carboxylate
butyl 1-hydroxy-1-(4-methoxybiphenyl-4'-yl)-cyclohexane-4-carboxylate
pentyl 1-hydroxy-1-(4-methoxybiphenyl-4'-yl)-cyclohexane-4-carboxylate
hexyl 1-hydroxy-1-(4-methoxybiphenyl-4'-yl)-cyclohexane-4-carboxylate
heptyl 1-hydroxy-1-(4-methoxybiphenyl-4'-yl)-cyclohexane-4-carboxylate
octyl 1-hydroxy-1-(4-methoxybiphenyl-4'-yl)-cyclohexane-4-carboxylate
methyl 1-hydroxy-1-(4-octyloxyphenyl)-cyclohexane-4-carboxylate
ethyl 1-hydroxy-1-(4-octyloxyphenyl)-cyclohexane-4-carboxylate
propyl 1-hydroxy-1-(4-octyloxyphenyl)-cyclohexane-4-carboxylate
butyl 1-hydroxy-1-(4-octyloxyphenyl)-cyclohexane-4-carboxylate
pentyl 1-hydroxy-1-(4-octyloxyphenyl)-cyclohexane-4-carboxylate
hexyl 1-hydroxy-1-(4-octyloxyphenyl)-cyclohexane-4-carboxylate
heptyl 1-hydroxy-1-(4-octyloxyphenyl)-cyclohexane-4-carboxylate
octyl 1-hydroxy-1-(4-octyloxyphenyl)-cyclohexane-4-carboxylate
methyl 1-hydroxy-1-(4-heptyloxyphenyl)-cyclohexane-4-carboxylate
ethyl 1-hydroxy-1-(4-heptyloxyphenyl)-cyclohexane-4-carboxylate
propyl 1-hydroxy-1-(4-heptyloxyphenyl)-cyclohexane-4-carboxylate
butyl 1-hydroxy-1-(4-heptyloxyphenyl)-cyclohexane-4-carboxylate
pentyl 1-hydroxy-1-(4-heptyloxyphenyl)-cyclohexane-4-carboxylate
hexyl 1-hydroxy-1-(4-heptyloxyphenyl)-cyclohexane-4-carboxylate
heptyl 1-hydroxy-1-(4-heptyloxyphenyl)-cyclohexane-4-carboxylate
octyl 1-hydroxy-1-(4-heptyloxyphenyl)-cyclohexane-4-carboxylate
methyl 1-hydroxy-1-(4-hexyloxyphenyl)-cyclohexane-4-carboxylate
ethyl 1-hydroxy-1-(4-hexyloxyphenyl)-cyclohexane-4-carboxylate propyl 1-hydroxy-1-(4-hexyloxyphenyl)-cyclohexane-4-carboxylate
butyl 1-hydroxy-1-(4-hexyloxyphenyl)-cyclohexane-4-carboxylate
pentyl 1-hydroxy-1-(4-hexyloxyphenyl)-cyclohexane-4-carboxylate
hexyl 1-hydroxy-1-(4-hexyloxyphenyl)-cyclohexane-4-carboxylate
heptyl 1-hydroxy-1-(4-hexyloxyphenyl)-cyclohexane-4-carboxylate
octyl 1-hydroxy-1-(4-hexyloxyphenyl)-cyclohexane-4-carboxylate
methyl 1-hydroxy-1-(4-pentyloxyphenyl)-cyclohexane-4-carboxylate
ethyl 1-hydroxy-1-(4-pentyloxyphenyl)-cyclohexane-4-carboxylate
propyl 1-hydroxy-1-(4-pentyloxyphenyl)-cyclohexane-4-carboxylate
butyl 1-hydroxy-1-(4-pentyloxyphenyl)-cyclohexane-4-carboxylate
pentyl 1-hydroxy-1-(4-pentyloxyphenyl)-cyclohexane-4-carboxylate
hexyl 1-hydroxy-1-(4-pentyloxyphenyl)-cyclohexane-4-carboxylate
heptyl 1-hydroxy-1-(4-pentyloxyphenyl)-cyclohexane-4-carboxylate
octyl 1-hydroxy-1-(4-pentyloxyphenyl)-cyclohexane-4-carboxylate
methyl 1-hydroxy-1-(4-butoxyphenyl)-cyclohexane-4-carboxylate
ethyl 1-hydroxy-1-(4-butoxyphenyl)-cyclohexane-4-carboxylate
propyl 1-hydroxy-1-(4-butoxyphenyl)-cyclohexane-4-carboxylate
butyl 1-hydroxy-1-(4-butoxyphenyl)-cyclohexane-4-carboxylate
pentyl 1-hydroxy-1-(4-butoxyphenyl)-cyclohexane-4-carboxylate
hexyl 1-hydroxy-1-(4-butoxyphenyl)-cyclohexane-4-carboxylate
heptyl 1-hydroxy-1-(4-butoxyphenyl)-cyclohexane-4-carboxylate
octyl 1-hydroxy-1-(4-butoxyphenyl)-cyclohexane-4-carboxylate
methyl 1-hydroxy-1-(4-propoxyphenyl)-cyclohexane-4-carboxylate
ethyl 1-hydroxy-1-(4-propoxyphenyl)-cyclohexane-4-carboxylate
propyl 1-hydroxy-1-(4-propoxyphenyl)-cyclohexane-4-carboxylate
butyl 1-hydroxy-1-(4-propoxyphenyl)-cyclohexane-4-carboxylate
pentyl 1-hydroxy-1-(4-propoxyphenyl)-cyclohexane-4-carboxylate
hexyl 1-hydroxy-1-(4-propoxyphenyl)-cyclohexane-4-carboxylate
heptyl 1-hydroxy-1-(4-propoxyphenyl)-cyclohexane-4-carboxylate
octyl 1-hydroxy-1-(4-propoxyphenyl)-cyclohexane-4-carboxylate
methyl 1-hydroxy-1-(4-ethoxyphenyl)-cyclohexane-4-carboxylcte
ethyl 1-hydroxy-1-(4-ethoxyphenyl)-cyclohexane-4-carboxylate
propyl 1-hydroxy-1-(4-ethoxyphenyl)-cyclohexane-4-carboxylate
butyl 1-hydroxy-1-(4-ethoxyphenyl)-cyclohexane-4-carboxylate
pentyl 1-hydroxy-1-(4-ethoxyphenyl)-cyclohexane-4-carboxylate
hexyl 1-hydroxy-1-(4-ethoxyphenyl)-cyclohexane-4-carboxylate
heptyl 1-hydroxy-1-(4-ethoxyphenyl)-cyclohexane-4-carboxylate
octyl 1-hydroxy-1-(4-ethoxyphenyl)-cyclohexane-4-carboxylate
methyl 1-hydroxy-1-(4-methoxyphenyl)-cyclohexane-4-carboxylate
ethyl 1-hydroxy-1-(4-methoxyphenyl)-cyclohexane-4-carboxylate
propyl 1-hydroxy-1-(4-methoxyphenyl)-cyclohexane-4-carboxylate
butyl 1-hydroxy-1-(4-methoxyphenyl)-cyclohexane-4-carboxylate
pentyl 1-hydroxy-1-(4-methoxyphenyl)-cyclohexane-4-carboxylate
hexyl 1-hydroxy-1-(4-methoxyphenyl)-cyclohexane-4-carboxylate
heptyl 1-hydroxy-1-(4-methoxyphenyl)-cyclohexane-4-carboxylate
octyl 1-hydroxy-1-(4-methoxyphenyl)-cyclohexane-4-carboxylate
methyl 1-hydroxy-1-(4-octylphenyl)-cyclohexane-4-carboxylate
ethyl 1-hydroxy-1(4-octylphenyl)-cyclohexane-4-carboxylate
propyl 1-hydroxy-1-(4-octylphenyl)-cyclohexane-4-carboxylate
butyl 1-hydroxy-1-(4-octylphenyl)-cyclohexane-4-carboxylate
pentyl 1-hydroxy-1-(4-octylphenyl)-cyclohexane-4-carboxylate
hexyl 1-hydroxy-1-(4-octylphenyl)-cyclohexane-4-carboxylate
heptyl 1-hydroxy-1-(4-octylphenyl)-cyclohexane-4-carboxylate
ethyl 1-hydroxy-1-(4-heptylphenyl)-cyclohexan-4-carboxylate
propyl 1-hydroxy-1-(4-heptylphenyl)-cyclohexan-4-carboxylate
butyl 1-hydroxy-1-(4-heptylphenyl)-cyclohexan-4-carboxylate
pentyl 1-hydroxy-1-(4-heptylphenyl)-cyclohexan-4-carboxylate
hexyl 1-hydroxy-1-(4-heptylphenyl)-cyclohexan-4-carboxylate
heptyl 1-hydroxy-1-(4-heptylphenyl)-cyclohexan-4-carboxylate
octyl 1-hydroxy-1-(4-heptylphenyl)-cyclohexan-4-carboxylate
methyl 1-hydroxy-1-(4-hexylphenyl)-cyclohexan-4-carboxylate
ethyl 1-hydroxy-1-(4-hexylphenyl)-cyclohexan-4-carboxylate
propyl 1-hydroxy-1-(4-hexylphenyl)-cyclohexan-4-carboxylate
butyl 1-hydroxy-1-(4-hexylphenyl)-cyclohexan-4-carboxylate
pentyl 1-hydroxy-1-(4-hexylphenyl)-cyclohexan-4-carboxylate
hexyl 1-hydroxy-1-(4-hexylphenyl)-cyclohexan-4-carboxylate
heptyl 1-hydroxy-1-(4-hexylphenyl)-cyclohexan-4-carboxylate
octyl 1-hydroxy-1-(4-hexylphenyl)-cyclohexan-4-carboxylate methyl 1-hydroxy-1-(4-pentylphenyl)-cyclohexan-4-carboxylate
ethyl 1-hydroxy-1-(4-pentylphenyl)-cyclohexan-4-carboxylate
propyl 1-hydroxy-1-(4-pentylphenyl)-cyclohexan-4-carboxylate
butyl 1-hydroxy-1-(4-pentylphenyl)-cyclohexan-4-carboxylate
octyl 1-hydroxy-1-(4-octylphenyl)-cyclohexane-4-carboxylate
methyl 1-hydroxy-1-(4-heptylphenyl)-cyclohexane-4-carboxylate
pentyl 1-hydroxy-1-(4-pentylphenyl)-cyclohexane-4-carboxylate
hexyl 1-hydroxy-1-(4-pentylphenyl)-cyclohexane-4-carboxylate
heptyl 1-hydroxy-1-(4-pentylphenyl)-cyclohexane-4-carboxylate
octyl 1-hydroxy-1-(4-pentylphenyl)-cyclohexane-4-carboxylate
methyl 1-hydroxy-1-(4-butylphenyl)-cyclohexane-4-carboxylate
ethyl 1-hydroxy-1-(4-butylphenyl)-cyclohexane-4-carboxylate
propyl 1-hydroxy-1-(4-butylphenyl)-cyclohexane-4-carboxylate
butyl 1-hydroxy-1-(4-butylphenyl)-cyclohexane-4-carboxylate
pentyl 1-hydroxy-1-(4-butylphenyl)-cyclohexane-4-carboxylate
hexyl 1-hydroxy-1-(4-butylphenyl)-cyclohexane-4-carboxylate
heptyl 1-hydroxy-1-(4-butylphenyl)-cyclohexane-4-carboxylate
octyl 1-hydroxy-1-(4-butylphenyl)-cyclohexane-4-carboxylate
methyl 1-hydroxy-1-(4-propylphenyl)-cyclohexane-4-carboxylate
ethyl 1-hydroxy-1-(4-propylphenyl)-cyclohexane-4-carboxylate
propyl 1-hydroxy-1-(4-propylphenyl)-cyclohexane-4-carboxylate
butyl 1-hydroxy-1-(4-propylphenyl)-cyclohexane-4-carboxylate
pentyl 1-hydroxy-1-(4-propylphenyl)-cyclohexane-4-carboxylate
hexyl 1-hydroxy-1-(4-propylphenyl)-cyclohexane-4-carboxylate
heptyl 1-hydroxy-1-(4-propylphenyl)-cyclohexane-4-carboxylate
octyl 1-hydroxy-1-(4-propylphenyl)-cyclohexane-4-carboxylate
methyl 1-hydroxy-1-(4-ethylphenyl)-cyclohexane-4-carboxylate
ethyl 1-hydroxy-1-(4-ethylphenyl)-cyclohexane-4-carboxylate
propyl 1-hydroxy-1-(4-ethylphenyl)-cyclohexane-4-carboxylate
butyl 1-hydroxy-1-(4-ethylphenyl)-cyclohexane-4-carboxylate
pentyl 1-hydroxy-1-(4-ethylphenyl)-cyclohexane-4-carboxylate
hexyl 1-hydroxy-1-(4-ethylphenyl)-cyclohexane-4-carboxylate
heptyl 1-hydroxy-1-(4-ethylphenyl)-cyclohexane-4-carboxylate
octyl 1-hydroxy-1-(4-ethylphenyl)-cyclohexane-4-carboxylate
methyl 1-hydroxy-1-(4-methylphenyl)-cyclohexane-4-carboxylate
ethyl 1-hydroxy-1-(4-methylphenyl)-cyclohexane-4-carboxylate
propyl 1-hydroxy-1-(4-methylphenyl)-cyclohexane-4-carboxylate
butyl 1-hydroxy-1-(4-methylphenyl)-cyclohexane-4-carboxylate
pentyl 1-hydroxy-1-(4-methylphenyl)-cyclohexane-4-carboxylate
hexyl 1-hydroxy-1-(4-methylphenyl)-cyclohexane-4-carboxylate
heptyl 1-hydroxy-1-(4-methylphenyl)-cyclohexane-4-carboxylate
octyl 1-hydroxy-1-(4-methylphenyl)-cyclohexane-4-carboxylate

We claim:

1. A tertiary alcohol of the Formula I

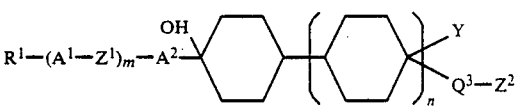

and the corresponding dehydrated compounds of the Formula IV

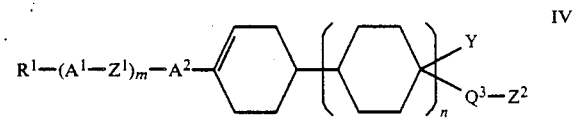

wherein
$R^1$ is halogen, or if $n-1$, $m=1$ or both n and $m=1$, $R^1$ can also be alkyl having 1-15 C atoms in which one $CH_2$ group can be replaced by O, —CO—, —CO—O—, or —CH=CH—;
$A^1$ is 1,4-phenylene or 1,4-cyclohexylene which is unsubstituted or monosubstituted or polysubstituted by halogen, $CH_3$, or combinations thereof;
$Z^1$ is —$CH_2CH_2$—, —$CH_2O$—, —$OCH_2$—, or a single bond;
m is 0, 1, or 2;
n is 0 or 1;
$A^2$ is 1,4-phenylene which is unsubstituted, substituted or monosubstituted or polysubstituted by halogen, $CH_3$, or combinations thereof;
$Z^2$ is —COOR or —CN;
$Q^3$ is alkylene having 1-15 C atoms, alkylidene having 2-14 C atoms, or a single bond;
Y is H, CN, or R; and
R is alkyl having 1-15 C atoms
and metal alcoholates of the compounds of Formula I.

2. A compound as claimed in claim 1, wherein n is 1, m is 1, or both n and m are 1 and $R^1$ is an alkyl group which has 1-15 C atoms and in which one $CH_2$ group can be replaced by O and/or —CO—O—.

3. A compound as claimed in claim 1 wherein $A^2$ is a 1,4-phenylene which is unsubstituted or monosubstituted by halogen.

4. A compound as claimed in claim 1, wherein m is 0 or 1.

5. A compound as claimed in claim 1, wherein $A^1$ is 1,4-cyclohexylene or 1,4-phenylene which are unsubstituted or monosubstituted by halogen.

6. A compound as claimed in claim 1, wherein n=0.

7. A compound as claimed in claim 1, wherein $Z^1$ is —$CH_2CH_2$— or a single bond.

8. A compound as claimed in claim 1, wherein $Q^3$ is alkylene having 1-15 C atoms or a single bond.

9. A compound as claimed in claim 1, wherein $Z^2$ is —COOR.

* * * * *